US011460034B2

(12) United States Patent
Koesters et al.

(10) Patent No.: US 11,460,034 B2
(45) Date of Patent: Oct. 4, 2022

(54) APPARATUS AND METHOD FOR EVACUATING VERY LARGE VOLUMES

(71) Applicant: Flowserve Management Company, Irving, TX (US)

(72) Inventors: Heiner Koesters, Itzehoe (DE); Joerg Temming, Itzehoe (DE); Soenke Siebels, Hamburg (DE); Daniel Kuehlein, Ellerau (DE)

(73) Assignee: Flowserve Management Company, Irving, TX (US)

( * ) Notice: Subject to any disclaimer, the term of this patent is extended or adjusted under 35 U.S.C. 154(b) by 412 days.

(21) Appl. No.: 16/675,854

(22) Filed: Nov. 6, 2019

(65) Prior Publication Data

US 2020/0158028 A1        May 21, 2020

Related U.S. Application Data

(60) Provisional application No. 62/767,862, filed on Nov. 15, 2018.

(51) Int. Cl.
*F04D 25/04* (2006.01)
*F04D 25/16* (2006.01)
(Continued)

(52) U.S. Cl.
CPC ........... *F04D 19/042* (2013.01); *F04D 17/10* (2013.01); *F04D 19/04* (2013.01); *F04D 25/04* (2013.01); *F04D 25/16* (2013.01)

(58) Field of Classification Search
CPC .......... F04D 25/04; F04D 19/00; F04D 25/16; F04D 17/10; F04D 19/04; F04D 19/042;
(Continued)

(56) References Cited

U.S. PATENT DOCUMENTS 2,973,894 A    3/1961  Kimball et al.
3,006,288 A *  10/1961 Brown .................... B61B 13/08
                                                    104/23.1
(Continued)

FOREIGN PATENT DOCUMENTS

CN    109356647 A    2/2019
EP      1544473 A2   6/2005
(Continued)

OTHER PUBLICATIONS

Hartranft, John; 1991; "GE LM2500 Marine Gas Turbine Experience"; The Amenrican Society of Mechanical Engineers, pp. 1-6 (Year: 1991).*
(Continued)

*Primary Examiner* — Kenneth J Hansen
*Assistant Examiner* — Benjamin Doyle
(74) *Attorney, Agent, or Firm* — Maine Cernota & Rardin

(57) ABSTRACT

A target volume evacuation system includes a turbo compressor and a vacuum pump, the system being operable in a first configuration to reduce the target volume pressure from ambient to a first intermediate pressure, e.g. between 200 mbar and 50 mbar, and in a second configuration to further reduce the pressure from a second intermediate pressure, e.g. 10 mBar, to a target partial vacuum, e.g. between 0.1 and 1 mbar. The turbo compressor can be driven electrically or by fuel combustion, and can be a conventional or modified turbojet engine. A plurality of turbo compressors can be transitioned from parallel to series operation. The pressure can be reduced from the first to the second intermediate pressure by venting the target volume to a boom-tank volume and/or by configuring the turbo compressor system to provide backing to the vacuum pumping system. The invention is applicable to a hyperloop transport system.

22 Claims, 13 Drawing Sheets

(51) Int. Cl.
*F04D 17/10* (2006.01)
*F04D 19/04* (2006.01)

(58) Field of Classification Search
CPC ...... F02C 3/32; F02C 6/00; F02C 7/18; F02C 9/52
USPC .......................................................... 417/244
See application file for complete search history.

(56) References Cited

U.S. PATENT DOCUMENTS

| | | | | |
|---|---|---|---|---|
| 3,922,110 | A * | 11/1975 | Huse | F04B 9/02 60/431 |
| 4,225,288 | A * | 9/1980 | Mugele | F04B 49/20 417/247 |
| 4,470,576 | A | 9/1984 | Schertler | |
| 4,505,647 | A * | 3/1985 | Alloca | F04B 37/14 417/252 |
| 4,699,570 | A * | 10/1987 | Bohn | F04C 28/02 417/69 |
| 4,850,806 | A * | 7/1989 | Morgan | F04B 37/14 417/205 |
| 5,595,477 | A * | 1/1997 | Amlinger | F04D 25/16 417/205 |
| 5,944,049 | A * | 8/1999 | Beyer | G05D 16/208 137/907 |
| 6,004,109 | A * | 12/1999 | Gebele | F04C 25/02 417/205 |
| 6,589,023 | B2 * | 7/2003 | Royce | F04B 41/06 417/2 |
| 7,021,888 | B2 * | 4/2006 | Jostlein | F04D 19/042 417/205 |
| 7,814,922 | B2 * | 10/2010 | Tollner | G05D 16/2073 137/12 |
| 10,094,381 | B2 * | 10/2018 | Calhoun | F04C 23/005 |
| 10,286,928 | B1 | 5/2019 | Neophytou et al. | |
| 2004/0079257 | A1 | 4/2004 | Tidmarsh et al. | |
| 2007/0295209 | A1 * | 12/2007 | Strauser | B01D 45/16 95/271 |
| 2010/0116349 | A1 | 5/2010 | Fischer | |
| 2016/0229297 | A1 | 8/2016 | Finodeyev et al. | |
| 2016/0230899 | A1 * | 8/2016 | Cothern | F16K 3/12 |
| 2017/0146136 | A1 | 5/2017 | Cothem et al. | |
| 2017/0350632 | A1 * | 12/2017 | Hirao | F25J 1/0269 |
| 2019/0211661 | A1 * | 7/2019 | Reckels | E21B 43/267 |
| 2019/0344806 | A1 | 11/2019 | Kalra et al. | |
| 2020/0001897 | A1 | 1/2020 | Neophytou et al. | |
| 2020/0083676 | A1 * | 3/2020 | Rochin Machado | H02B 1/52 |
| 2020/0109705 | A1 * | 4/2020 | Suzuki | F04B 39/0027 |

FOREIGN PATENT DOCUMENTS

| | | |
|---|---|---|
| JP | 7172579 A | 7/1995 |
| JP | 2009011182 A | 1/2009 |
| JP | 2012180032 A | 9/2012 |
| KR | 20110069392 A | 6/2011 |
| KR | 101130807 B1 | 3/2012 |
| KR | 101920414 B1 | 11/2018 |
| WO | 2009061443 A1 | 5/2009 |

OTHER PUBLICATIONS

International Search Report and Written Opinion for PCT Appl. No. PCT/US2020/031452, dated Jan. 29, 2021, 12 Pages.
International Search Report and Written Opinion for International Application No. PCT/US2019/060049, dated Apr. 9, 2020, 12 Pages.
International Preliminary Report on Patentability for Application No. PCT/US2019/060049, dated May 27, 2021, 10 pages.
Extended European Search Report for Application No. EP 19885343.4, dated Dec. 14, 2021, 7 pages.
International Search Report and Written Opinion for PCT Appl. No. PCT/US2021/015071, dated Apr. 28, 2021, 10 Pages.

* cited by examiner

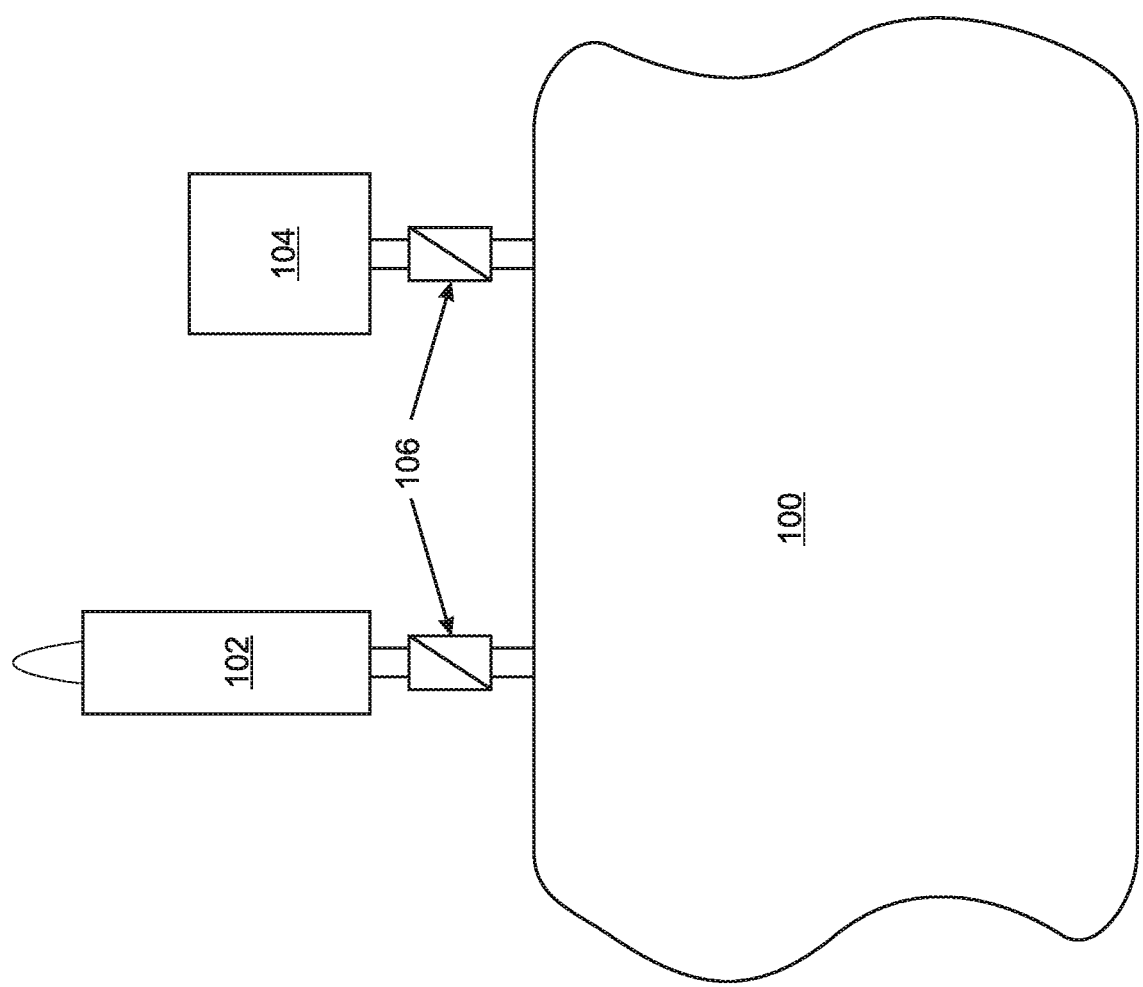

APPARATUS AND METHOD FOR EVACUATING VERY LARGE VOLUMES

RELATED APPLICATIONS

This application claims the benefit of U.S. Provisional Application No. 62/767,862, filed Nov. 15, 2018, which is herein incorporated by reference in its entirety for all purposes.

FIELD OF THE INVENTION

The invention relates to vacuum systems, and more particularly, to apparatus and methods for evacuating very large volumes.

BACKGROUND OF THE INVENTION

The conventional methods of conveying groups of people over large distances can be categorized into four basic types: rail, road, water, and air. Transportation by road and water tends to be relatively inexpensive, but is comparatively slow. Travel by air is much faster, but is expensive. Rail transportation of people can be both slow and expensive.

Several alternatives for rapidly and economically conveying large numbers of people over long distances have been proposed, such as hypersonic transport of magnetically levitated passenger capsules through highly evacuated underground tubes. However, these proposals have not proven to be feasible in practice, due to the high costs of tunneling, cooling of superconducting magnets, and maintaining the required ultra-high vacuums.

However, there is a new approach, often referred to as "hyperloop," which appears to overcome the problems of previous concepts, and which is likely to become a new paradigm for rapid, inexpensive mass transit of both goods and people over distances up to about 900 miles. According to the hyperloop concept, capsules will be propelled over long distances through transportation tubes that are elevated and mounted on pylons. The tubes will be evacuated to a partial vacuum, which may be a pressure between 0.1 millibar (mbar) and 1 mbar, whereby the pressure will be sufficiently low to reduce air friction past the capsules, while also being sufficiently high to allow the capsules to aerodynamically ride on air cushions, in cases where magnetic levitation is not preferred. The tubes will be sectioned, for example into lengths of 10-20 miles each, so that individual sections can be vented for maintenance without venting the entire tube.

One of the key aspects of the hyperloop concept is the use of a "partial" vacuum in the tube, rather than an ultra-high vacuum, which greatly reduces the difficulty of creating and maintaining the vacuum within the tube. Even for this partial vacuum it is estimated that the unavoidable leakage, due to the length of the pipe, the many interconnections that will be required, and the very high volume of the system, will require continuous pumping of the tubes at a rate of typically 20,000-50,000 actual cubic feet per minute (ACFM) per mile of tube to maintain the partial vacuum. While this is a significant requirement, it is expected that a sufficient quantity of conventional vacuum pumps will be able to meet the requirement.

However, until the present invention, a satisfactory solution had not been found for initially reducing the pressure in the tubes from ambient down to the operating partial vacuum. Unfortunately, this "initial" pump-down is not expected to be a one-time event. Due to maintenance, repairs, and other requirements, it will be necessary to periodically re-pressurize sections of the pipes and then bring them once again from ambient down to the operating partial vacuum.

One approach is simply to "oversize" the vacuum pumping system, either by enlarging the sizes of the pump and/or by providing more pumps, so that the system has sufficient capacity to evacuate the tube from ambient pressure. Existing proposals suggest implementing multi-stage vacuum systems that include booster pumps such as dry screw pumps or any of several types of "root" blowers with a high staging ratio from the first vacuum stage to the final stage to atmosphere. These proposals address the problem of high mass flow pumping at startup by oversizing the atmospheric stages in the vacuum system or reducing the stage ratio.

However, even when booster pumps are included these approaches tend to be very slow, and also tend to dramatically increase the power consumption and cost of the pumping system, even if the additional pumps required for initial pump-down are switched off once the partial vacuum is achieved. For example, according to some estimates it is expected that 50 mega-Watts of power will be needed to operate the vacuum pumps that will be needed to maintain the partial vacuum within a typical hyperloop tube. The high power consumption of these proposed solutions is problematic, not only because of the energy cost, but also because of the cost of providing oversized power sources, cabling, and couplings to meet the excessive power requirements during pump-down.

Much of this added cost during pump-down is due to the inefficiency of vacuum pumps when operating at near-ambient pressures. Efficient pumping of air at near-ambient pressures requires a system that can produce a high mass flow across a small pressure differential. However, vacuum pumps are optimized for pumping a low mass flow across a high pressure differential. As a result, vacuum pumps do not function efficiently at near-ambient pressures, while conventional ambient pressure pumps do not function well as vacuum pumps. For this reason, a pump (or pumping system) that is efficient for maintaining a tube at a one mbar partial vacuum or lower will be highly inefficient or ineffective if required to pump a high mass flow from a tube that is at ambient pressure, such that the energy requirement is excessive, and the time required for the tube to return to vacuum is unrealistically long.

What is needed, therefore, is an efficient, cost-effective system and method for quickly reducing the pressure within a very large volume from ambient to a partial vacuum, such as a partial vacuum between 0.1 mbar and 1 mbar, preferably without requiring a large surge in electrical power consumption.

SUMMARY OF THE INVENTION

The present invention is a cost-effective system and method for quickly and efficiently reducing the pressure within a very large volume from ambient to a partial vacuum, which in embodiments is between 0.1 mbar and 1 mbar. Embodiments provide the required reduction in pressure without requiring a large surge in electrical power consumption. While the invention is sometimes described herein with reference to a hyperloop mass transportation system, it should be noted that the invention is not limited to use with a hyperloop system, but is applicable to any system that requires rapid evacuation of a very large volume of air or gas.

The present invention provides high mass flow evacuation of a large volume of air or gas within a target volume during the initial phase of a "pump down" by implementing a turbo compressor system comprising at least one turbo compressor. Turbo compressors are not generally considered to be suitable for use in vacuum applications because they are operable only over a limited range of pressure differentials, and are subject to failure due to "surging" if they are operated with too little mass flow. Even for applications such as evacuating large chambers used for testing spacecraft, which can have volumes of more than 10,000 cubic meters, turbo compressors are considered to be unsuitable, because they would only be operable for a very short time during the initial, near-ambient phase of the pumping process, and would therefore provide only a minimal reduction in the pump-down time.

As such, at the time of the invention the application of turbo compressors to evacuation systems was contrary to the accepted wisdom in the art. However, even a single section of a hyperloop tube, which may be 10-30 miles long, is expected to have a volume that could be in the millions of cubic meters. Accordingly, the present inventors realized that hyperloop represents a new paradigm, and this led the present inventors to proceed contrary to the accepted wisdom in the art, and to implement turbo compressors as part of an evacuation system.

In embodiments, the turbo compressor system of the present invention is operable to reduce pressure within the target volume from ambient to below 200 mbar. In some of these embodiments, the turbo compressor system is operable to reduce the pressure in the target volume to below 100 mbar, or even below 50 mbar. Once this intermediate pressure in the target volume is achieved, the turbo compressor system is isolated from the target volume, and a more conventional vacuum pumping system functions to reduce the pressure within the target volume to the final target partial vacuum.

In some embodiments, the impellers of the one or more turbo compressors are driven by electric motors. In other embodiments, the impellors of the turbo compressors are rotated by turbines that are driven by streams of gas, which in embodiments are produced by combustion of a fuel. And in some of these embodiments the turbine-driven turbo compressors are modified, or in some embodiments conventional, turbojet engines. In embodiments, otherwise conventional turbojet engines are modified by adapting their output nozzle, thereby reducing thrust and improving the allowable pressure ratio with reduced noise as compared to conventional operation.

The present invention reduces the requirement for excess electrical power sources and cables, because the turbo compressor system is much more efficient than convention vacuum pumping systems at near-ambient pressures. Turbojet embodiments and other embodiments that incorporate turbine-driven turbo compressors that are driven by combustion of a fuel further reduce or eliminate any need for excess electrical power during pump-down, because the pumping energy during the initial phase of a pump-down is mainly or entirely provided by combustion of a fuel, rather than by electric power. As a result, installation requirements can be dramatically reduced, especially in rural locations.

In various embodiments, the vacuum pumping system comprises at least one vacuum pump, wherein the at least one vacuum pump can comprise at least one multi-stage pump that includes one or more screw and/or "roots" type vacuum blowers as a first and/or second stage, combined with one or more oil-sealed or dry running vacuum pumps and/or liquid ring pumps as secondary stages to provide compression against the atmospheric pressure in the surrounding ambient environment.

Embodiments include valves and a control system that operate to isolate the turbo compressor system from the target volume once a first intermediate pressure has been achieved. In embodiments, the control system and valves further operate to isolate the vacuum pumping system from the target volume during operation of the turbo compressor system.

It is notable that embodiments of the present invention are applicable primarily or exclusively to the initial "pump down" of a large volume. For some systems, such as a hyperloop transportation tube, it may be necessary to maintain a partial vacuum in a plurality of separate large volumes. For example, each segment of a hyperloop transportation tube will represent a separate very large volume that can be isolated from the remainder when it becomes necessary to vent the section for maintenance, upgrade, or for any other reason. It is reasonable to expect that such requirements will be infrequent, and will occur for different segments of the tube at different times.

Accordingly, embodiments of the present invention provide the turbo compressor system on a vehicle that is suitable for transporting the turbo compressor system between a plurality of target volumes for use in pumping down the various target volumes as needed. Some embodiments include a suitable transportation infrastructure such as a rail system that runs parallel to a hyperloop tube. In other embodiments, the vehicle is capable and suitable for transport on conventional roadways.

In embodiments, fittings that are suitable for connecting and attaching the vehicle-mounted turbo compressor system are provided as part of each of the target volumes. In some embodiments, a supplementary vacuum pumping system is also provided on the vehicle and is used to supplement the partial vacuum maintenance vacuum pumping systems that are permanently associated with each of the target volumes, so as to further accelerate the pump down times. In various embodiments, the vehicle, turbo compressor system, and/or supplementary vacuum pumping system are remotely monitored and/or controlled.

According to method embodiments of the present invention, a turbo compressor system and a vacuum pumping system are both cooperative with a target volume, and operate during a "pump down" to reduce the pressure within the target volume from ambient pressure to a target partial vacuum. In embodiments, the turbo compressor system and the vacuum pumping system are separately connected to the target volume, and/or interconnected with each other by suitable valves.

In an initial phase of the pump down, the turbo compressor system is primarily responsible for reducing the pressure within the target volume from ambient to a first intermediate pressure. In some embodiments, the first intermediate pressure is sufficiently high to directly support efficient operation of the turbo compressors without surges so that the turbo compressor(s) can operate directly on the target volume during the entire initial phase.

In other embodiments, the initial pumping phase is divided into a first initial phase and a second initial phase. During the first initial phase the turbo compressor(s) operate directly on the target volume until the pressure drops to a minimum inlet pressure that is needed to sustain proper operation of the turbo compressors without surging, which can be between 700 mBar and 400 mBar. At that point valves are activated so as to reconfigure the turbo compressor system to be able to continue to reduce the target volume pressure until it reaches the first intermediate pressure, which can be between 200 mBar and 50 mBar. In some of these embodiments, one or more gas ejectors are inserted into the system which introduce additional inlet gas into the turbo compressor inlets, so that they can continue to operate efficiently and without surges while the target volume pressure continues to drop.

In other embodiments where a plurality of turbo compressors are provided, the turbo compressors operate in parallel during the first turbo compressor phase. Once the minimum inlet pressure of between 700 mBar and 400 mBar is achieved, valves are operated to place the turbo compressors into one or more groups of turbo compressors, wherein the turbo compressors within each group are connected in series. Some of these embodiments further incorporate gas ejectors into the pumping system. The target volume pressure is thereby further reduced to the first intermediate pressure while the pressure differential across each of the turbo compressors remains within operational limits.

During a final evacuation phase, the vacuum pumping system operates to further reduce the pressure within the target volume from a second intermediate pressure to the target partial vacuum, which in embodiments is between 0.1 mbar and 1 mbar. In some of these embodiments, the turbo compressor system is isolated from the target volume during the final evacuation phase, while in other embodiments at least one turbo compressor operates in series with at least one vacuum pump of the vacuum pumping system.

In some embodiments, the first and second intermediate pressures are equal, whereby the evacuation process is directly transitioned from the turbo compressor phase to the final evacuation phase. In other embodiments, when the first intermediate pressure is achieved, the target volume is vented to a separate, pre-evacuated "boom-tank" volume, which in embodiments is even larger than the target volume. The pressure within the target volume is thereby lowered from the first intermediate pressure to the second intermediate pressure by partial or complete pressure equalization between the target volume and the boom-tank volume. The vacuum pumping system then resumes evacuation of the target volume, which in embodiments remains vented to the boom-tank volume, from the second intermediate pressure to the target partial vacuum.

In embodiments, the boom-tank volume is at least 5-10 times larger than the target volume, and the second intermediate pressure is at least 5-10 times lower than the first intermediate pressure. In some of these embodiments, the first intermediate pressure is between approximately 200 mbar and approximately 50 mbar, and the second intermediate pressure is between 50 mbar and 10 mbar. In various embodiments, a boom tank vacuum pumping system is in gas communication with the boom-tank volume, and operates together with the target volume vacuum pumping system to reduce the pressure of the combined target volume and boom-tank volume from the second intermediate pressure to the target partial vacuum.

Embodiments are applicable to a hyperloop system, wherein the target volume is a single segment of a multi-segment transportation tube of the hyperloop system, and wherein the transportation tube is configured to enable isolation between the segments, for example when it is necessary to vent one of the segments to perform maintenance. In some of these embodiments, the boom tank volume comprises at least one additional segment of the hyperloop transportation tube that is adjacent to the target volume segment.

A first general aspect of the present invention is an apparatus for establishing a target partial vacuum within a target volume. The system includes a turbo compressor system comprising a first turbo compressor, the turbo compressor system being operable during a first evacuation phase to reduce a pressure within the target volume from ambient pressure to a first intermediate pressure, a vacuum pumping system, and an interconnecting system operable under control of a controller to establish gas communication between the turbo compressor system and the target volume, and between the vacuum pumping system and the target volume.

In embodiments, the vacuum pumping system is operable during a final evacuation phase to reduce the pressure within the target volume from a second intermediate pressure to the target partial vacuum.

In any of the above embodiments, the turbo compressor system can include a centrifugal turbo compressor.

In any of the above embodiments, the turbo compressor system can include an axial turbo compressor.

In any of the above embodiments, the turbo compressor system can include a turbo compressor having an impellor that is rotated by an electric motor.

In any of the above embodiments, the turbo compressor system can include a turbine-driven turbo compressor having an impellor that is rotated by a gas-driven turbine driven by gas produced by combustion of a fuel. In some of these embodiments, the turbojet engine is substantially identical in design with an aircraft turbojet engine that is operable for propelling an aircraft. And in some of these embodiments the turbojet engine included in the turbo compressor system is substantially identical in design with an aircraft turbojet engine that is operable for propelling an aircraft, except that the turbojet engine included in the turbo compressor system does not include an outlet nozzle.

In any of the above embodiments, the vacuum pumping system can include at least one multi-stage pump that includes at least one of a screw type vacuum blower, a "roots" type vacuum blower, an oil-sealed vacuum pump, a dry running vacuum pump, and a liquid ring pump.

In any of the above embodiments, the turbo compressor system can further include a gas ejector.

In any of the above embodiments, the turbo compressor system can further include an intercooler.

In any of the above embodiments, the turbo compressor system can further include a second turbo compressor, and the interconnecting system can be configured to transition the second turbo compressor from being connected in parallel with the first turbo compressor to being connected in series with the first turbo compressor.

In any of the above embodiments, the interconnecting system can be configured to transition the first turbo compressor from a first configuration in which the first turbo compressor is in direct gas communication with the target volume to a second configuration in which the first turbo compressor is in gas communication with the vacuum pumping system and configured to provide backing to the vacuum pumping system.

In any of the above embodiments, the target volume can be a segment of a multi-segment transportation tube of a hyperloop transportation system, wherein each of a plurality of the segments includes fitting for connection therewith to the turbo compressor system, and wherein the turbo compressor system is mounted on a vehicle that is able to convey the turbo compressor system between the segments for connection during pump down thereof. In some of these embodiments a pump-down vacuum pumping system is also mounted on the vehicle and is operable for enhancing a rate of pump down during the final evacuation phase. And in any of these embodiments the vehicle can be suitable for transporting the compressor system over conventional highways.

A second general aspect of the present invention is a method for reducing a pressure in a target volume from ambient pressure to a target partial vacuum. The method includes the following steps:
- A) providing an apparatus according to any preceding claim;
- B) configuring the interconnecting system in a first configuration whereby the turbo compressor system is in direct gas communication with the target volume;
- C) operating the turbo compressor system during an initial evacuation phase until a pressure within the target volume is reduced from ambient to a first intermediate pressure.
- D) configuring the interconnecting system in a second configuration; and
- E) operating the apparatus during a final evacuation phase until the pressure in the target volume is reduced from a second intermediate pressure to the target partial vacuum.

In embodiments, the second configuration the turbo compressor system is isolated from direct gas communication with the target volume, and the vacuum pumping system is in direct gas communication with the target volume.

In any of the above embodiments of this general aspect, step B) can further include isolating the turbo compressor system from direct gas communication with the target volume during the final evacuation phase.

In any of the above embodiments of this general aspect, the turbo compressor system can include a first turbo compressor and a second turbo compressor; the initial phase can include a first initial phase and a second initial phase; and the method can further include configuring the first and second turbo compressors in parallel during the first initial phase and configuring the first and second turbo compressors in series during the second initial phase.

In any of the above embodiments of this general aspect, the target partial vacuum can be a pressure between 0.1 mbar and 1 mbar.

In any of the above embodiments of this general aspect, the first intermediate pressure can be between 200 mbar and 50 mbar, and the second intermediate pressure is between 50 mbar and 10 mbar.

In any of the above embodiments of this general aspect, the method can further include between steps C) and D), causing the interconnecting system to isolate the turbo compressor system from direct gas communication with the target volume, and causing the interconnecting system to connect the target volume in gas intercommunication with a boom-tank volume, said boom tank volume having an internal boom tank pressure before said connecting that is lower than the second intermediate pressure, thereby reducing the pressure within the target volume from the first intermediate pressure to the second intermediate pressure. In some of these embodiments, the target volume can be a segment of a multi-segment transportation tube of a hyperloop transportation system, and wherein the boom tank volume includes at least one segment of the transportation tube that is adjacent to the target volume.

In any of the above embodiments of this general aspect, the method can further include between steps C) and D), connecting the vacuum pumping system in direct gas communication with the target volume, isolating the turbo compressor system from direct gas communication with the target volume, while configuring the turbo compressor system to provide backing to the vacuum pumping system, and operating the apparatus until the pressure within the target volume is reduced from the first intermediate pressure to the second intermediate pressure.

In any of the above embodiments of this general aspect, the second intermediate pressure can be equal to the first intermediate pressure.

In any of the above embodiments of this general aspect, in the second configuration, the vacuum pumping system can be in direct gas communication with the target volume.

And in any of the above embodiments of this general aspect, in the second configuration, the turbo compressor system can be in direct gas communication with the target volume.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 is a block diagram illustrating an apparatus embodiment of the present invention;

DETAILED DESCRIPTION

Figure 2A:
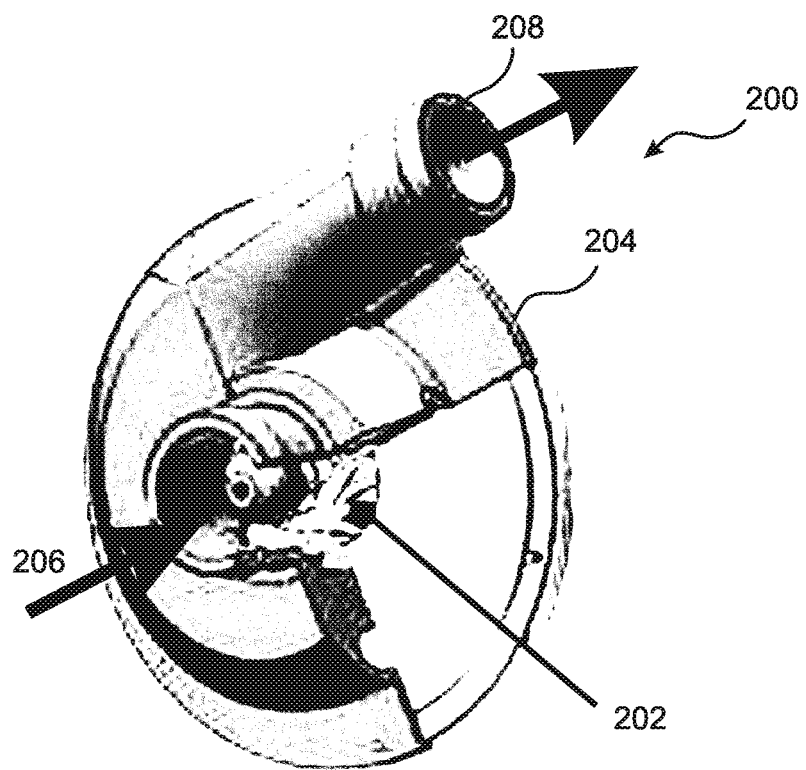
FIG. 2A is a perspective view of a centrifugal turbo compressor.

The present invention is an efficient, cost-effective system and method for quickly and efficiently reducing the pressure within a very large volume from ambient to a target partial vacuum, which in embodiments is between 0.1 mbar and 1 mbar. Embodiments provide the required reduction in pressure without requiring a large surge in electrical power consumption. While the invention is sometimes described herein with reference to a hyperloop mass transportation system, it should be noted that the invention is not limited to use with a hyperloop system, but is applicable to any system that requires rapid evacuation of a very large volume of air or gas.

With reference to FIG. 1, the present invention is a system and method that provide high mass flow evacuation of a large volume of air or gas within a target volume 100 by implementing a turbo compressor system 102 comprising at least one turbo compressor in combination with a vacuum pumping system 104 that comprises conventional vacuum pumps. The turbo compressor system 102 and the vacuum pumping system 104 operate during a "pump down" to reduce the pressure within the target volume 100 from ambient pressure to a target partial vacuum. In an initial phase of the pump down, the turbo compressor system 102 is primarily responsible for reducing the pressure within the target volume 100 from ambient to a first intermediate pressure, and during a final phase of the pump down the vacuum pumping system 104 is primarily responsible for reducing the pressure within the target volume 100 from a second intermediate pressure to the final target pressure, which in embodiments is between 0.1 mbar and 1 mbar. In embodiments, the turbo compressor system 102 and the vacuum pumping system 104 are separately connected to the target volume 100, and/or interconnected with each other by suitable valves 106.

In embodiments, the turbo compressor system 102 is operable to reduce pressure within the target volume 100 from ambient to below 200 mbar. In some of these embodiments, the turbo compressor system 102 is operable to reduce the pressure in the target volume 100 to below 100 mbar.

Figure 2B:
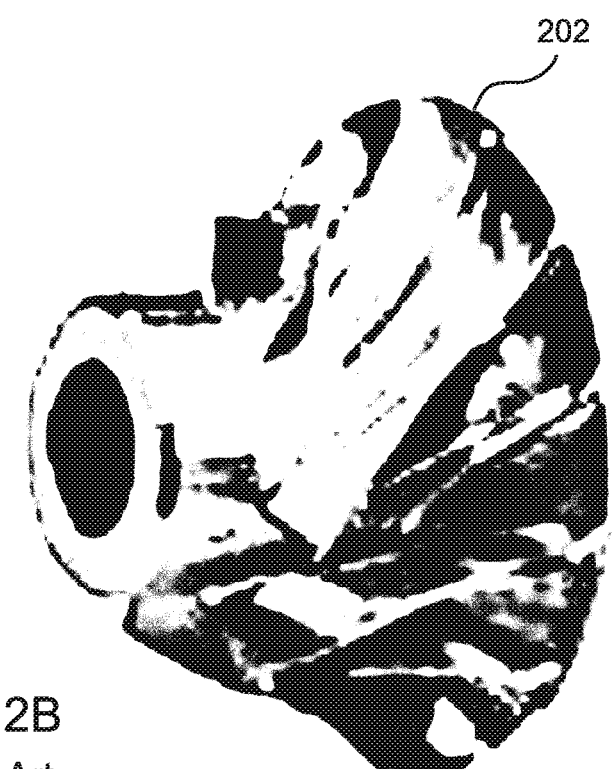
FIG. 2B is a perspective view of the rotor of the turbo compressor of FIG. 2A.

With reference to FIGS. 2A, 2B, 3, and 4, as is known in the art, a turbo compressor 200, 300, 400 comprises an impeller 202, also referred to as a rotor, which is typically mounted on a shaft 302 and rotated within a housing 204. FIGS. 2A and 2B illustrate a centrifugal turbo compressor 200, wherein gas enters the housing 204 axially through an inlet 206, is centrifugally compressed toward an outer circumference of the impeller 202, and is ejected through an outlet 208 in a direction that is at right angles to the inlet 206.

Figure 3:
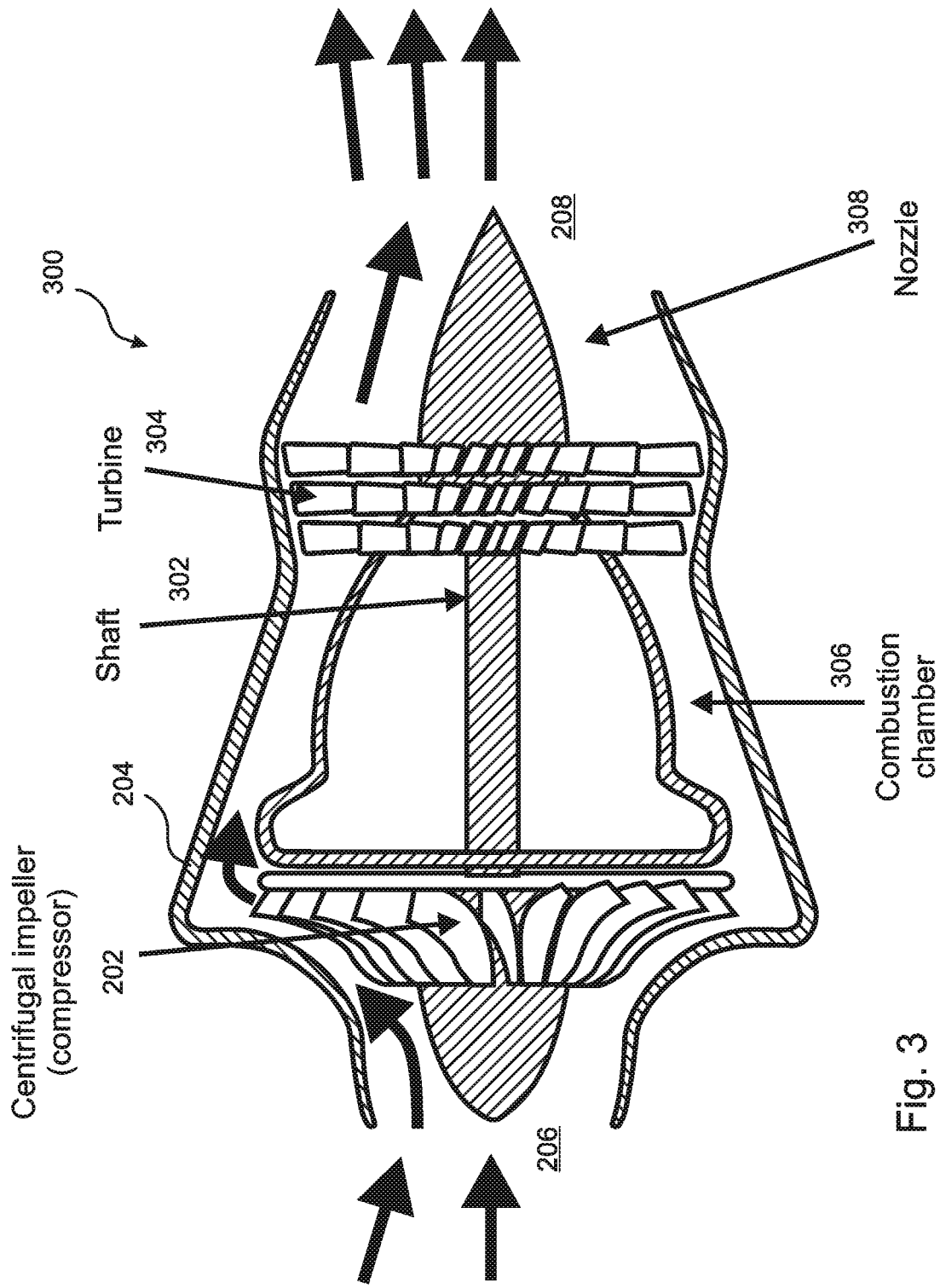
FIG. 3 is a side sectional view of a centrifugal turbojet engine of the prior art.
Figure 4:
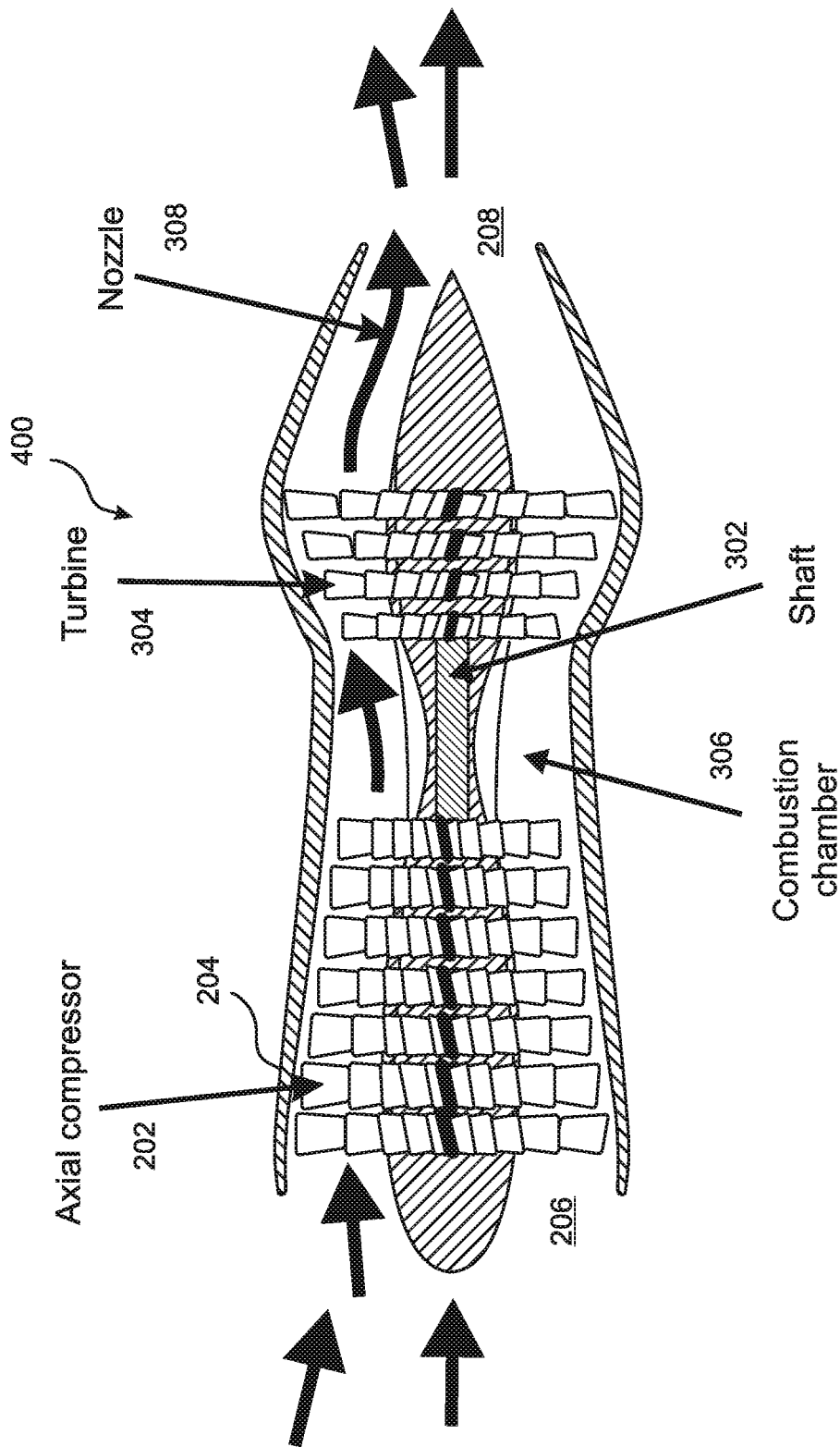
FIG. 4 is a side sectional view of an axial turbojet engine of the prior art.
Figure 7:
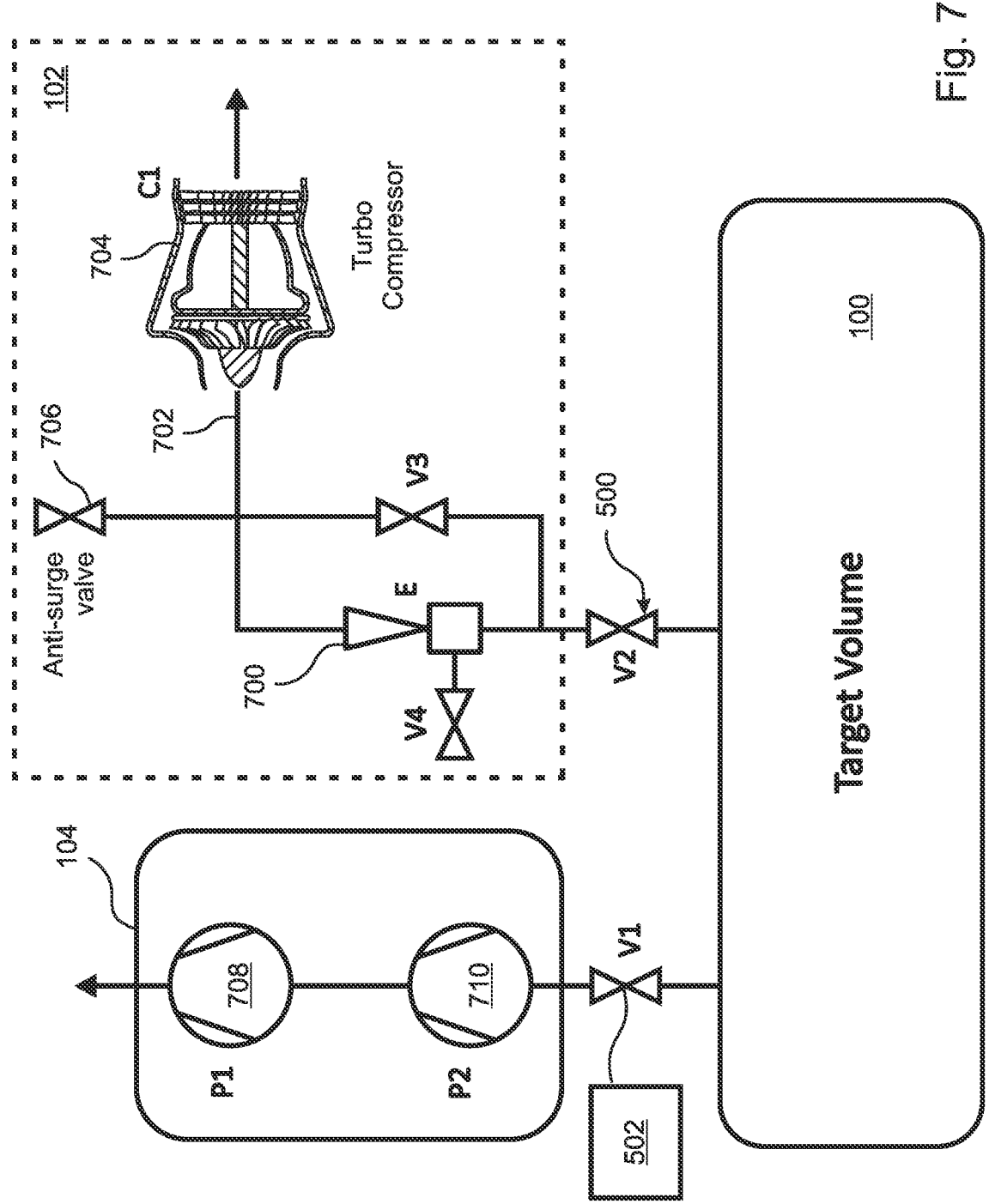
FIG. 7 is a block diagram of an apparatus that incorporates a gas ejector in the turbo compressor system.

In some embodiments, the impeller shafts 302 of the at least one turbo compressor are rotated by electric motors. With reference to FIGS. 3 and 4, in other embodiments the turbo compressors 102 are turbine-driven turbo compressors 300, 400, wherein the impeller shafts 302 are rotated by turbines 304 that are driven by streams of gas, which in embodiments are produced by combustion of a fuel 306. In some of these embodiments the turbine-driven turbo compressors are turbojet engines 300, 400, which in some embodiments are implemented without substantial modifications, as shown in FIGS. 3 and 4. In similar embodiments, otherwise conventional turbojet engines 300, 400 are modified by redesigning or eliminating their output nozzles 308, thereby reducing thrust, increasing the pressure ratio, and reducing noise as compared to conventional turbojet engines. An example of a turbo compressor 704 having a design similar to turbojet engine 300 but without an output nozzle is shown in FIG. 7, which is discussed in more detail below.

FIG. 3 illustrates a centrifugal turbojet engine 300, in that the impeller 202 drives the inlet gasses 206 radially outward, after which the housing 204 of the engine 300 redirects the gasses to be expelled axially out of the engine 300. FIG. 4 illustrates an axial turbojet engine 400, in that the impeller 202 drives the inlet gasses 206 axially toward the outlet 208. Embodiments incorporate centrifugal and/or axial turbo compressors, which can be turbojet engines.

The present invention reduces the requirement for excess electrical power sources and cables, because the turbo compressor system 102 is much more efficient than conventional vacuum pumping systems 104 at near-ambient pressures. Turbojet embodiments and other embodiments that incorporate turbo pumps 300, 400 driven by combustion of a fuel further reduce or eliminate any need for excess electrical power during pump-down, because the pumping energy during the initial phase of a pump-down is mainly or entirely provided by combustion of a fuel, rather than by electric power.

In various embodiments, the vacuum pumping system 104 comprises at least one vacuum pump, wherein the at least one vacuum pump can comprise at least one multi-stage pump that includes one or more screw and/or "roots" type vacuum blowers as a first and/or second stage, combined with one or more oil-sealed or dry running vacuum pumps and/or liquid ring pumps as secondary stages to provide compression against the atmospheric pressure in the surrounding ambient environment.

Embodiments of the present invention provide the turbo compressor system on a vehicle that is suitable for transporting the turbo compressor system between a plurality of target volumes for use in pumping down the various target volumes as needed. Some embodiments include a suitable transportation infrastructure such as a rail system that runs parallel to a hyperloop tube. In other embodiments, the vehicle is capable and suitable for driving on conventional roadways. Examples include a tractor-pulled trailer or flatbed truck, as are commonly used for transporting heavy loads over conventional highways.

In embodiments, fittings that are suitable for connecting and attaching the vehicle-mounted turbo compressor system are provided as part of each of the target volumes. In some embodiments, a supplementary vacuum pumping system is also provided on the vehicle and is used to supplement the partial vacuum maintenance vacuum pumping systems that are permanently associated with each of the target volumes, so as to further accelerate the pump down times. In various embodiments, the vehicle, turbo compressor system, and/or supplementary vacuum pumping system are remotely monitored and/or controlled.

As is noted above, the turbo compressor system 102 and the vacuum pumping system 104 operate during a "pump down" to reduce the pressure within the target volume 100 from ambient pressure to a target partial vacuum, for example after the target volume 100 has been vented to ambient pressure for repair and maintenance and then re-sealed 600. In the initial phase of the pump down, the turbo compressor system 102 is primarily responsible for reducing the pressure from ambient to a first initial pressure, and during the final phase of the pump down the vacuum pumping system 104 is primarily responsible for reducing the pressure from a second intermediate pressure to the final target pressure.

Figure 5:
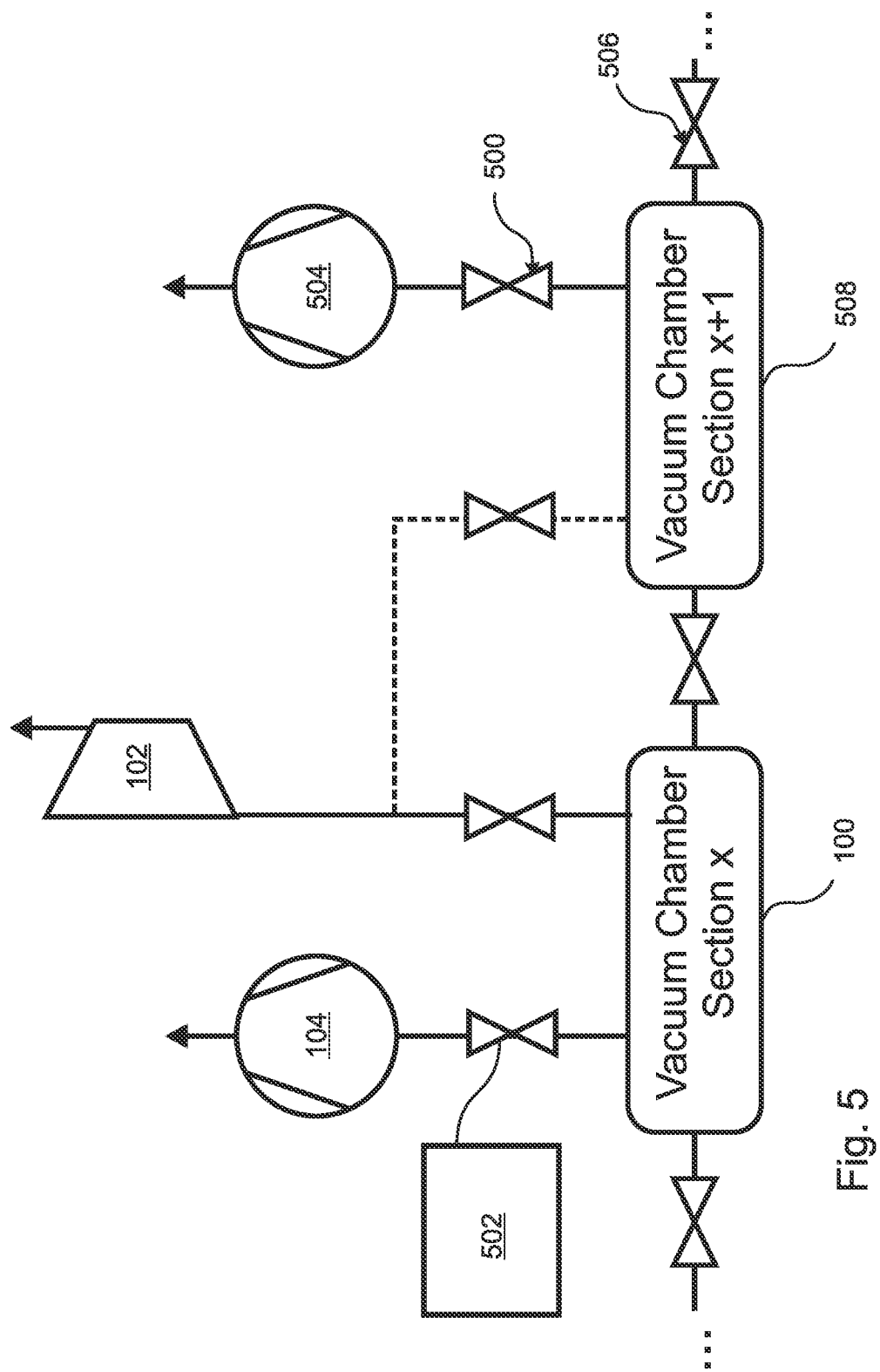
FIG. 5 if a block diagram of an apparatus embodiment that includes a boom-tank volume.

With reference to FIG. 5, embodiments include valves 500 and a control system 502 that operate to isolate the turbo compressor system 102 from the target volume 100 during the final phase of the pump down. In embodiments, the control system 502 and valves 500 further operate to isolate the vacuum pumping system 104 from the target volume 100 during operation of the turbo compressor system 102 during the initial phase of the pump down.

Figure 6:
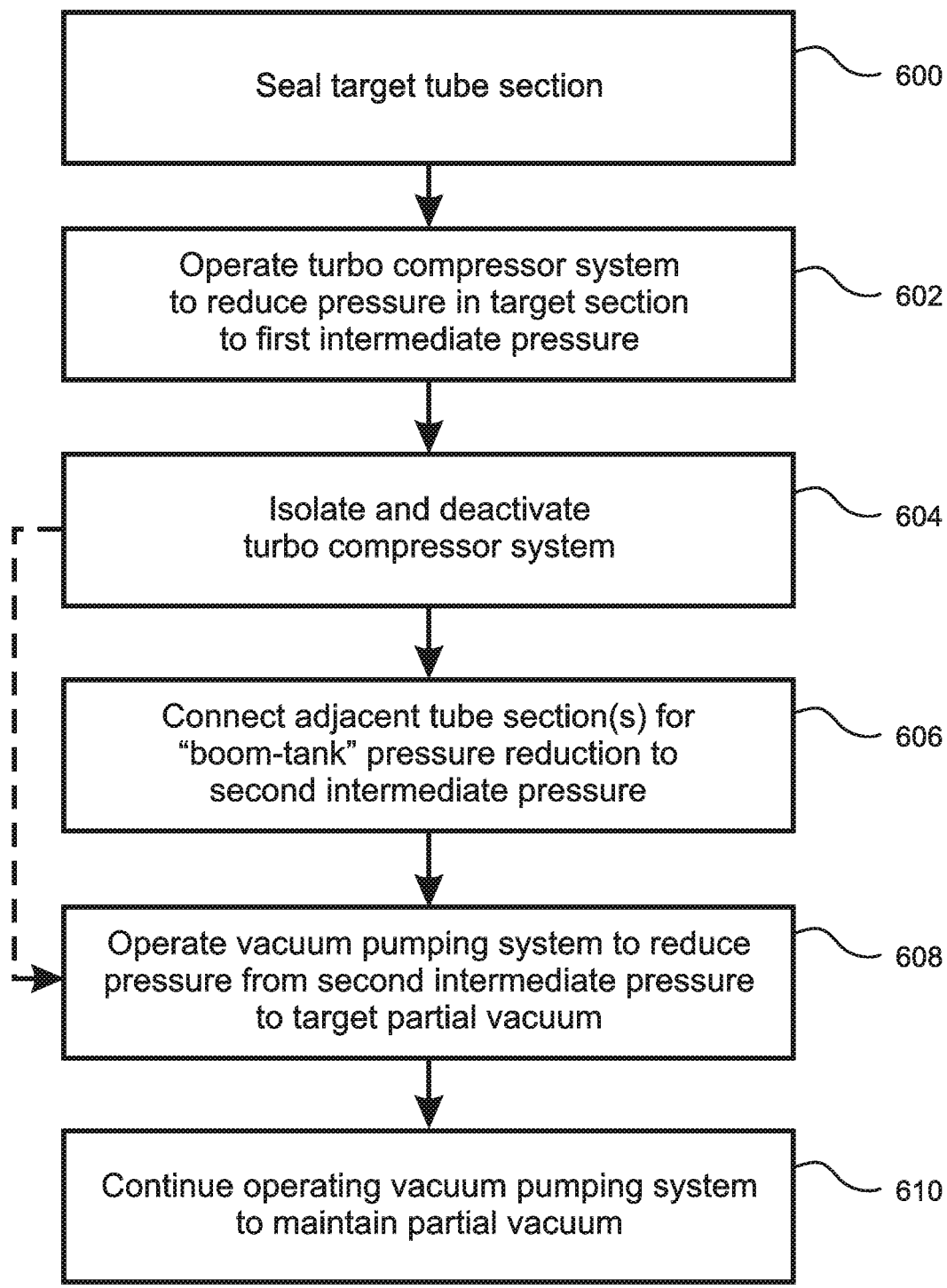
FIG. 6 is a flow diagram that illustrates a method embodiment of the present invention.

With reference to FIGS. 5 and 6, in embodiments, the turbo compressor system 102 and the vacuum pumping system 104 are separately connected to the target volume 100 by suitable valves 500. According to the method embodiment of FIG. 6, in the initial phase of the pump down, the turbo compressor system 102 takes primary responsibility for reducing the pressure within the target volume 100 from ambient to a first intermediate pressure 602. In embodiments, the vacuum pumping system 104 is isolated by the valves 500 from the target volume 100 during this initial phase. During the final phase of the pump down, the vacuum pumping system 104 assumes the primary responsibility to further reduce the pressure within the target volume 100 from the second intermediate pressure to the target partial vacuum 608, which in embodiments is between 0.1 mbar and 1 mbar. In the embodiment of FIG. 6, the turbo compressor system 102 is isolated from the target volume 100 and deactivated 604 during the final pump down phase.

In some embodiments, the first and second intermediate pressures are equal, whereby the initial phase of the pump down is immediately followed by the final phase of the pump down, thereby omitting step 606 in FIG. 6 (dashed line). In other embodiments, when the first intermediate pressure is achieved 604, the target volume 100 is vented 606 to a separate, pre-evacuated "boom-tank" volume 508, which in embodiments is the same size or even larger than the target volume 100, whereby the pressure within the target volume 100 is lowered from the first intermediate pressure to the second intermediate pressure by partial or complete pressure equalization between the target volume 100 and the boom-tank volume 606. In embodiments, the target volume 100 remains vented to the boom-tank volume 508 during the final phase of the pump down.

In embodiments, the boom-tank volume 508 is at least 5-10 times larger than the target volume 100, and the second intermediate pressure is at least 10 times lower than the first intermediate pressure. In some of these embodiments, the first intermediate pressure is between approximately 200 mbar and approximately 50 mbar, and the second intermediate pressure is between 50 mbar and 10 mbar. In various embodiments, a boom tank vacuum pumping system 504 is in gas communication with the boom-tank volume 508, and operates together with the target volume vacuum pumping system 104 to reduce the pressure of the combined target volume 100 and boom-tank volume 508 from the second intermediate pressure to the target partial vacuum 608. Once the target partial vacuum has been achieved 608, the vacuum pumping systems 104, 504, continue to operate so as to maintain the combined target and boom-tank volumes 100, 508 at the target partial vacuum.

Embodiments are applicable to a hyperloop system, wherein the target volume 100 is a single segment of a multi-segment transportation tube of the hyperloop system, and wherein the transportation tube is configured to enable isolation of the segments 100, 508 by closable divisions 506 provided between the segments 100, 508, for example when it is necessary to vent one of the segments 100 to perform maintenance. In some of these embodiments, the boom tank volume 508 comprises at least one additional segment of the hyperloop transportation tube that is adjacent to the target volume segment 100.

In some embodiments, the first intermediate pressure is sufficiently high to directly support efficient operation of the turbo compressors without surges so that the turbo compressor(s) can operate directly on the target volume 100 during the entire initial phase of the pump down. In other embodiments, the initial pumping phase is divided into a first initial phase and a second initial phase. During the first initial phase the turbo compressor(s) operate directly on the target volume until the pressure drops to a minimum inlet pressure that is needed to sustain proper operation of the turbo compressors without surging, which can be between 700 mBar and 400 mBar. At that point valves are activated so as to reconfigure the turbo compressor system to be able to continue to reduce the target volume pressure until it reaches the first intermediate pressure, which can be between 200 mBar and 50 mBar.

With reference to FIG. 7, in some of these embodiments one or more gas ejectors 700 are included in the turbo compressor system 102 which introduce additional gas into the inlets 702 of the turbo compressors 704, so that they can continue to operate efficiently during the second initial phase without surges while the pressure in the target volume 100 continues to drop.

In the embodiment of FIG. 7, during the first initial phase valves V2 and V3 are opened while all of the other valves in FIG. 7 are closed. This configuration allows the turbo compressor 704 to act directly on the target volume, while isolating the vacuum pumping system 104 and the gas ejector 700. Once the pressure in the target volume 100 reaches the minimum operating inlet pressure of the turbo compressor 704, for example at a pressure of between 600 mBar and 400 mBar, the turbo compressor system transitions to the second initial phase by closing valve V3 and opening valve V4, so that only valves V2 and V4 are open. In this configuration, together with the anti-surge valve 706, the gas ejector 700 introduces additional gas through valve V4 into the inlet 702 of the turbo compressor 704, thereby ensuring that the inlet pressure and flow of the turbo compressor 704 remains sufficiently high to avoid surges while the pressure in the target volume 100 continues to drop. During the final phase, valve V1 is opened while all other valves are shut, thereby allowing the vacuum pump system 104 to operate directly on the target volume 100 while the turbo compressor 704 is isolated from the target volume 100.

Figure 8:
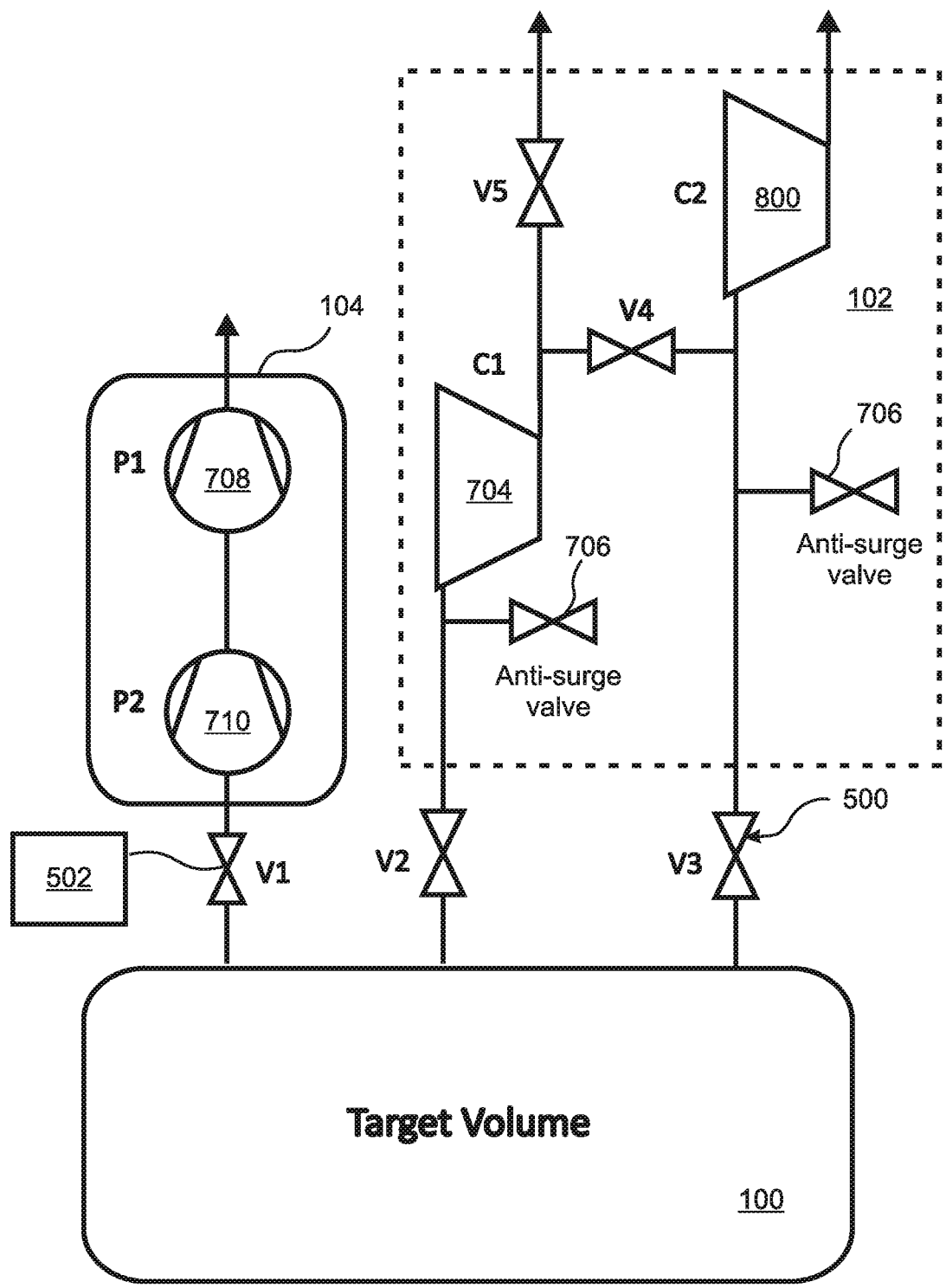
FIG. 8 is a block diagram of an apparatus in which the turbo compressor system includes two turbo compressors that can be operated in parallel or in series.

With reference to FIG. 8, in some embodiments where a plurality of turbo compressors 704, 800 are provided, the turbo compressors operate in parallel during the first initial phase, and in series during the second initial phase. In the embodiment of FIG. 8, valves V2, V3, and 53 are opened during the first initial phase while valves V1 and V4 are closed. Once the minimum inlet pressure of the turbo compressors 704, 800 is reached, for example between 700 mBar and 400 mBar, valve V4 is opened while valves V3 and V5 are closed, thereby placing the turbo compressors 704, 800 into series with each other. In general, if a larger number of turbo compressors is included in the turbo compressor system 102, then during the second initial phase they are divided into one or more groups of turbo compressors, wherein the turbo compressors within each group are connected in series.

By placing the two turbo compressors 704, 800 of FIG. 8 in series, the pressure differential across each of the turbo compressors 704, 800 remains within operational limits, while the pressure in the target volume 100 is reduce to one half of the pressure that could be reached by turbo compressors 704, 800 operating alone or in parallel. This lower limit can be extended still further by arranging three or more turbo compressors in series. Some of these embodiments further incorporate gas ejectors into the pumping system, as discussed above with reference to FIG. 7. The target volume pressure is thereby further reduced during the second initial phase until the pressure within the target volume 100 reaches the first intermediate pressure.

As discussed above, during the final phase of the pump down, the vacuum pumping system 104 operates to further reduce the pressure within the target volume 100 from a second intermediate pressure, such as between about 50 mBar and about 10 mBar, to the target partial vacuum, which in embodiments is between 0.1 mbar and 1 mbar. In embodiments, for example due to implementation of gas ejectors and/or arrangement of turbo compressors in series, the first intermediate pressure is sufficiently low, e.g. about 50 mBar, to enable the vacuum pumping system 104 to operate. In other words, the first intermediate pressure is equal to the second intermediate pressure, and the second phase of the pump down begins immediately once the first phase is completed. In other embodiments, as discussed above with reference to FIGS. 5 and 6, a boom tank is used to lower the pressure of the target volume 100 from the first intermediate pressure to the second intermediate pressure.

Figure 9A:
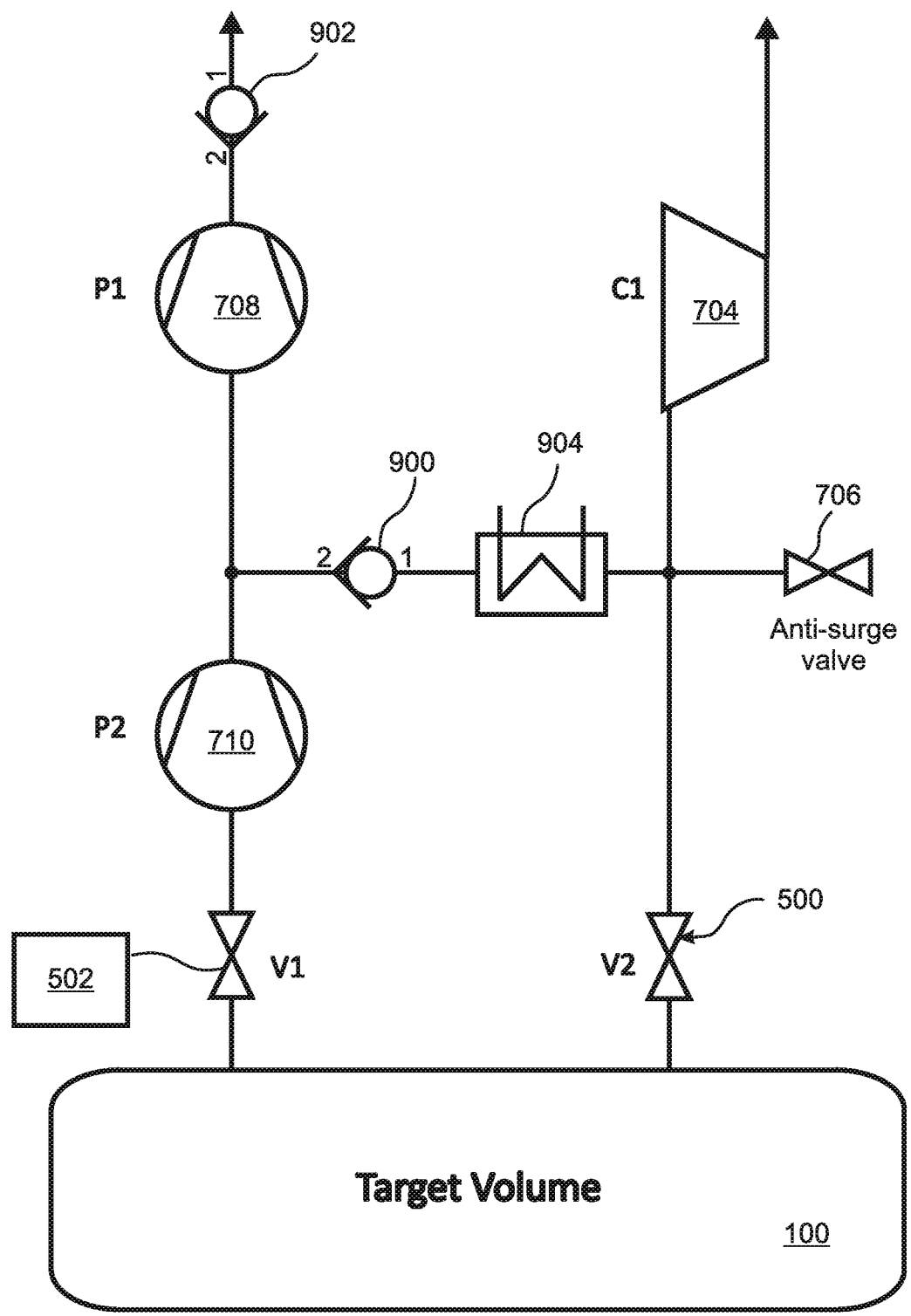
FIG. 9A is a block diagram of an apparatus in which the turbo compressor can provide backing to the vacuum pumping system through an intercooler.

In still other embodiments, elements of the vacuum pumping system and of the turbo compressor system work together to lower the pressure from the first intermediate pressure to the second intermediate pressure, after which the vacuum pumping system 104 assumes full responsibility to attain the target final pressure. As illustrated in FIGS. 7 and 8, in embodiments the vacuum pumping system 104 comprises a "booster" vacuum pump 710 and a backing pump 708. These can include, for example, screw, claw, roots, and/or oil-sealed backing pumps 708 in combination with roots- or screw-blower booster vacuum pumps 710. In the embodiment of FIG. 9A, a booster vacuum pump P2 710 is selected having a suction capacity that is of the same order of magnitude as the turbo compressor C1 704. When the target volume 100 is below the second intermediate pressure, the capacity of the backing pump P1 708 is sufficient to support the efficient operation of the booster pump 710. However, when the target pressure is at the higher first intermediate pressure, the capacity of the backing pump 708 is insufficient to support the booster pump 710, even though the booster pump would be able to operate efficiently at the first intermediate pressure if sufficient backing were provided.

Accordingly, in the embodiment of FIG. 9A an interconnection is provided through a one-way valve 900 between the outlet of the booster vacuum pump 710 and the inlet of the turbo compressor 704. During the initial phase of the pump down, valve V1 is closed, but the vacuum pumps P2 and P1 (710, 708) remain in operation, so that the pressure is low at the outlet (numbered "2" in the figure) of the one-way valve 900, thereby closing the one-way valve 900. Once the initial stage is completed, valve V1 is opened, while valve V2 is closed, thereby causing the one-way valve 900 to open, and configuring the turbo compressor 704 to function as an auxiliary backing pump to the booster pump 710. A second one-way valve 902 ensures that there is no reverse flow from ambient through the vacuum backing pump 708. Embodiments further include an additional intercooler 904 that functions to maintain the turbo compressor 704 in stable and efficient operation by cooling the outlet gas of the booster pump 710 before it enters the turbo compressor 704.

Figure 9B:
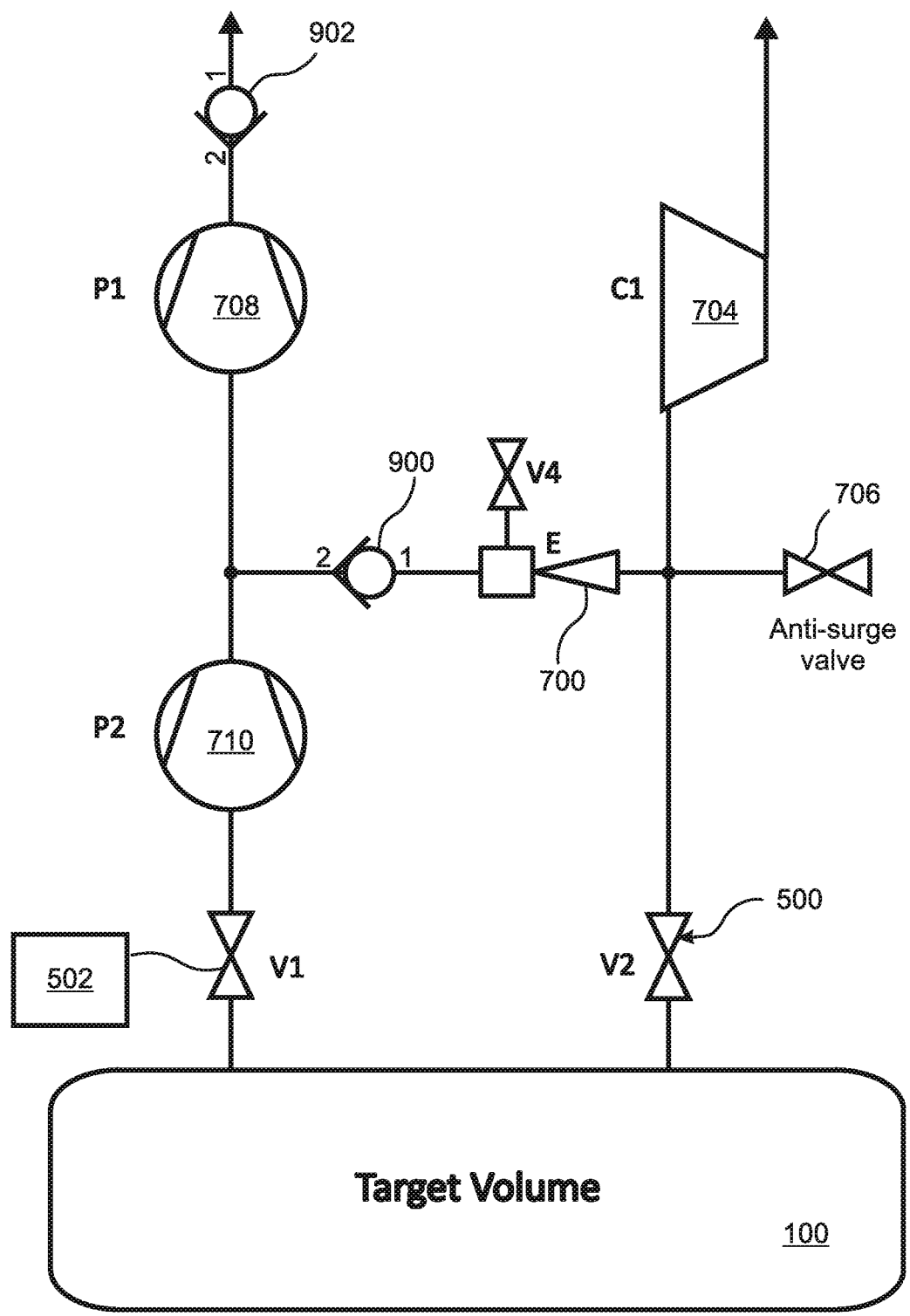
FIG. 9B is a block diagram of an apparatus similar to FIG. 9A in which the turbo compressor can provide backing to the vacuum pumping system through a gas ejector.

With reference to FIG. 9B, embodiments include a gas ejector 700 included between the outlet of the booster pump 710 and the inlet of the turbo compressor 704. The gas ejector 700 ensures that the pressure between the turbocompressor 704 and the gas ejector 700 remains constant at the first intermediate pressure as the pressure of the target volume 100 is reduced to the second intermediate pressure. This approach can reduce the thermal and mechanical load that is placed on the booster pump 710, and can allow the booster pump 710 to apply a higher suction to the target volume 100. It will be understood that some embodiments include both an intercooler 904 and a gas ejector 700, as are shown separately in FIGS. 9A and 9B.

Figure 10:
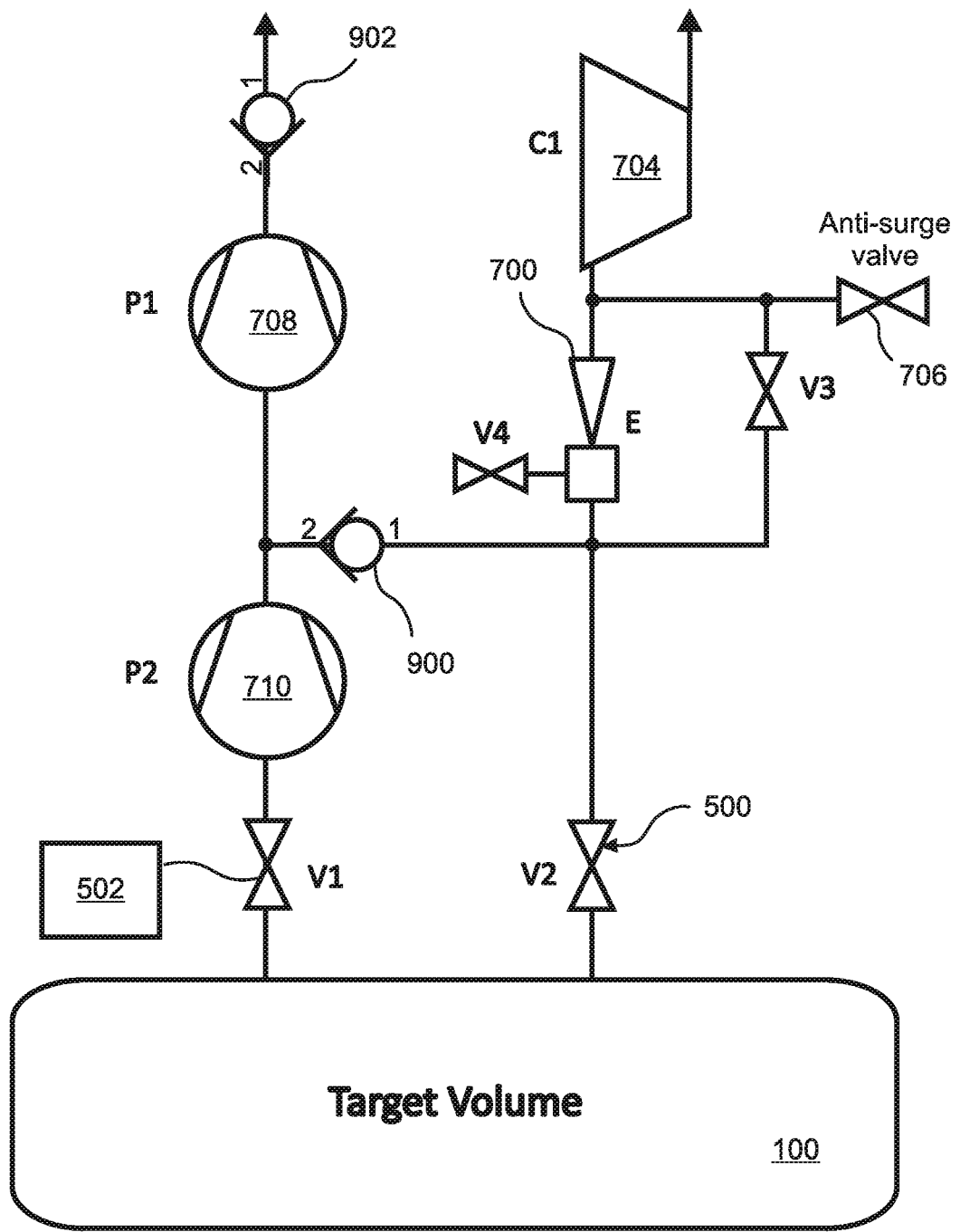
FIG. 10 is a block diagram of an apparatus similar to FIG. 9B, configured such that the turbo compressor can provide backup to the vacuum pumping system either directly or through a gas ejector.

FIG. 10 illustrates an embodiment similar to FIG. 9B, but in which the initial pump down phase can be divided into a first initial phase and a second initial phase, similar to the embodiment of FIG. 7. In the embodiment of FIG. 10, during the first initial phase valves V2 and V3 are open, while all other valves are closed. The turbo compressor 704 is thereby configured to directly pump on the target volume 100, while the vacuum pumping system remains in operation, causing the one-way valve 900 to be closed. At the end of the first initial phase, valve V3 is closed and valve V4 is opened, whereby the gas ejector 700 enables the pressure of the target volume 100 to be further reduced until it reaches the first intermediate pressure, while maintaining a higher pressure at the inlet to the turbo compressor 704. Once the first intermediate pressure has been reached, valve V2 is closed and valve V1 is opened, thereby allowing the booster vacuum pump 710 to further reduce the pressure within the target volume 100, with the backing of the turbo compressor 704, either alone (V3 open, V4 closed) or with the assistance of the gas ejector (V3 closed, V4 open), until the second intermediate pressure is reached.

Of course, the strategies that are illustrated in FIGS. 7 through 10 can be combined in various ways, depending on the requirements of the implementation. For example, FIG. 11 illustrates an embodiment that includes two turbo compressors 704, 800 and two intercoolers 904, 1100, that enables the initial pumping phase to be divided in to first and second pumping phases, and further configures one or both of the turbo compressors 704, 800 to provide additional backing to the booster vacuum pump 710 as the pressure in the target volume 100 is reduced from the first intermediate pressure to the second intermediate pressure.

Figure 11:
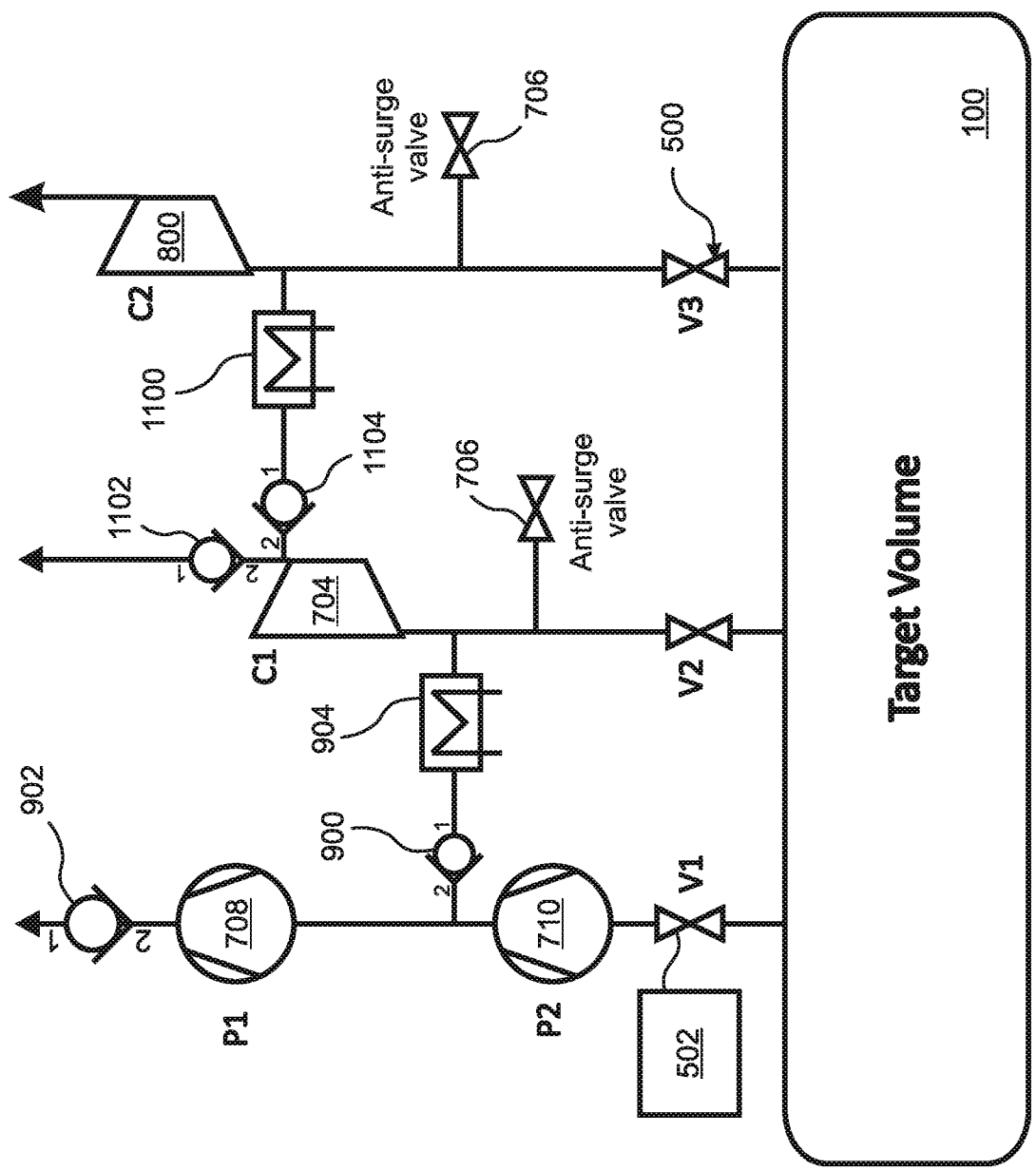
FIG. 11 is a block diagram of an apparatus in which the turbo compressor system includes two turbo compressors that can be operated in parallel or in series, either directly on the target volume or to provide backing to the vacuum pumping system.

More specifically, during the first initial phase of the pump down in the embodiment of FIG. 11, valves V2 and V3 are open, while valve V1 is closed. As a result, one way valve 1102 opens while one-way valve 1104 remains closed, such that the two turbo compressors 704, 800 are configured in parallel, and both pump directly on the target volume 100. During the second initial phase, valve V3 is closed, causing one-way valve 1102 to close and one-way valve 1104 to open, so that the two turbo compressors 704, 800 are configured in series. As the pressure of the target volume 100 is further reduced from the first intermediate pressure to the second intermediate pressure, valve V1 is open while valves V2 and V3 are closed, so that the booster vacuum pump 710 pumps on the target volume 100 with backing provided by the first turbo compressor 704, and possibly also by the second turbo compressor 800. Intercoolers 904, 1100 cool the inputs to the turbo compressors 704, 800 to improve their operating efficiency.

Figure 12:
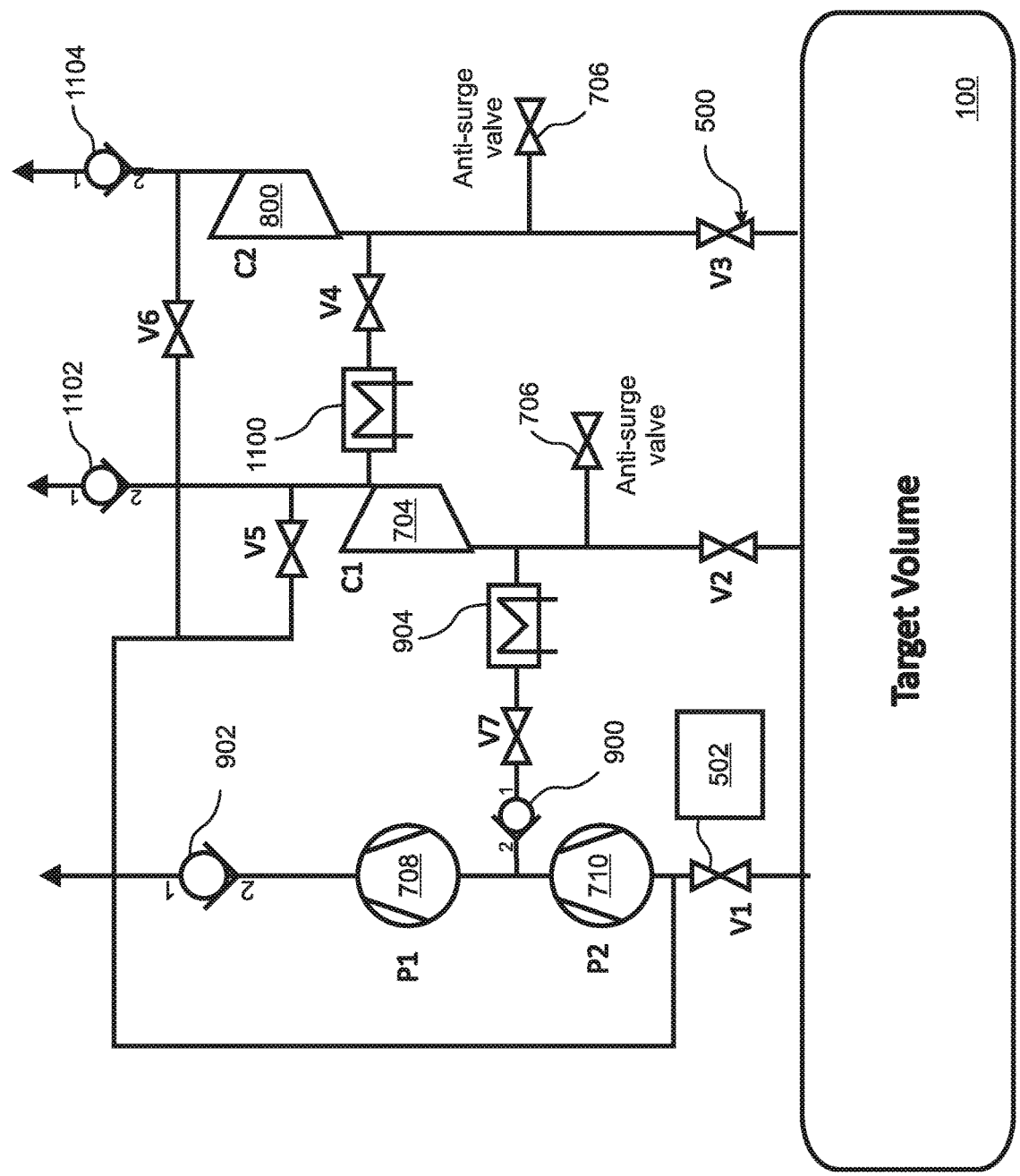
FIG. 12 is a block diagram of an apparatus similar to FIG. 11, but in which the turbo compressor system takes responsibility for the final phase of the pump down, with the vacuum pumping system being responsible only for maintenance of the partial vacuum within the target volume once the target pressure has been reached.

FIG. 12 illustrates an embodiment that is similar to FIG. 11, but in which the turbo compressor system 102 takes responsibility for the final phase of the pump down, with the vacuum pumping system 104 being responsible only for maintenance of the partial vacuum within the target volume 100 once the target pressure has been reached. The phases of the pump down for the embodiment of FIG. 12 are as follows:

First initial phase, target volume pressure is reduced from 1 bar to about 500 mbar, valves V2 and V3 open, all other valves closed, turbo compressors 704 and 800 pump directly on the target volume 100 in parallel.

Second initial phase, target volume pressure is reduced from about 500 mbar to about 250 mbar (first intermediate pressure), valves V2 and V4 open, all other valves closed, turbo compressors 704 and 800 pump on the target volume 100 in series.

Transition from first intermediate pressure of about 250 mBar to second intermediate pressure of about 10 mBar, valves V1, V4 and V7 open, all other valves closed, booster vacuum pump 710 pumps on target volume 100 with backing of both turbo pumps 704, 800 in series.

Final pumping phase from second intermediate pressure of about 10 mBar to target pressure between 1 mBar and 0.1 mBar, valves V2, V3, V5 and V6 open, all others closed, turbo pumps 704 and 800 pump in parallel on target volume 100 with backing of booster vacuum pump 710 and backing vacuum pump 708, anti-surge valves 706 ensure that sufficient gas is provided to the inlets of the turbo pumps 704, 800.

Partial vacuum maintenance, valve V1 open, all other valves closed booster vacuum pump 710 pumps on target volume 100 with backing of backing vacuum pump 708.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An apparatus for establishing a target partial vacuum within a target volume, the system comprising:

a turbo compressor system comprising a first turbo compressor, the turbo compressor system being operable during a first evacuation phase to reduce a pressure within the target volume from ambient pressure to a first intermediate pressure;

a vacuum pumping system; and an interconnecting system operable under control of a controller to transition the interconnecting system between a first configuration and a second configuration, wherein;

in the first configuration the turbo compressor system is in direct gas communication with the target volume; and in the second configuration the turbo compressor system is isolated from direct gas communication with the target volume, and the vacuum pumping system is in direct gas communication with the target volume.

2. The apparatus of claim 1, wherein the vacuum pumping system is operable during a final evacuation phase to reduce the pressure within the target volume from a second intermediate pressure to the target partial vacuum.

3. The apparatus of claim 1, wherein the turbo compressor system comprises a centrifugal turbo compressor.

4. The apparatus of claim 1, wherein the turbo compressor system comprises an axial turbo compressor.

5. The apparatus of claim 1, wherein the turbo compressor system comprises a turbo compressor having an impellor that is rotated by an electric motor.

6. The apparatus of claim 1, wherein the turbo compressor system comprises a turbine-driven turbo compressor having an impellor that is rotated by a gas-driven turbine driven by gas produced by combustion of a fuel.

7. The apparatus of claim 1, wherein the vacuum pumping system comprises at least one multi-stage pump that includes at least one of:

a screw type vacuum blower;

a "roots" type vacuum blower;

an oil-sealed vacuum pump;

a dry running vacuum pump; and a liquid ring pump.

8. The apparatus of claim 1, wherein the turbo compressor system further includes a gas ejector.

9. The apparatus of claim 1, wherein the turbo compressor system further includes an intercooler.

10. The apparatus of claim 1, wherein turbo compressor system further comprises a second turbo compressor, and wherein the interconnecting system is configured to transition the second turbo compressor from being connected in parallel with the first turbo compressor to being connected in series with the first turbo compressor.

11. The apparatus of claim 1, wherein the interconnecting system is configured to transition the first turbo compressor from a first configuration in which the first turbo compressor is in direct gas communication with the target volume to a second configuration in which the first turbo compressor is in gas communication with the vacuum pumping system and configured to provide backing to the vacuum pumping system.

12. A method for reducing a pressure in a target volume from ambient pressure to a target partial vacuum, the method comprising:

A) providing an apparatus according to claim 1;

B) configuring the interconnecting system in a first configuration whereby the turbo compressor system is in direct gas communication with the target volume;

C) operating the turbo compressor system during an initial evacuation phase until a pressure within the target volume is reduced from ambient to a first intermediate pressure;

D) configuring the interconnecting system in a second configuration whereby the turbo compressor system is isolated from direct gas communication with the target volume, and the vacuum pumping system is in direct gas communication with the target volume; and E) operating the apparatus during a final evacuation phase until the pressure in the target volume is reduced from a second intermediate pressure to the target partial vacuum.

13. The method of claim 12, wherein step B) further includes isolating the turbo compressor system from direct gas communication with the target volume during the final evacuation phase.

14. The method of claim 12, wherein:
the turbo compressor system comprises a first turbo compressor and a second turbo compressor;
the initial phase comprises a first initial phase and a second initial phase; and
the method further comprising configuring the first and second turbo compressors in parallel during the first initial phase and configuring the first and second turbo compressors in series during the second initial phase.

15. The method of claim 12, wherein the target partial vacuum is a pressure between 0.1 mbar and 1 mbar.

16. The method of claim 12, wherein the first intermediate pressure is between 200 mbar and 50 mbar, and the second intermediate pressure is between 50 mbar and 10 mbar.

17. The method of claim 12, wherein the method further includes between steps C) and D):
causing the interconnecting system to isolate the turbo compressor system from direct gas communication with the target volume; and
causing the interconnecting system to connect the target volume in gas intercommunication with a boom-tank volume, said boom tank volume having an internal boom tank pressure before said connecting that is lower than the second intermediate pressure, thereby reducing the pressure within the target volume from the first intermediate pressure to the second intermediate pressure.

18. The method of claim 17, wherein the target volume is a segment of a multi-segment transportation tube of a hyperloop transportation system, and wherein the boom tank volume includes at least one segment of the transportation tube that is adjacent to the target volume.

19. The method of claim 12, wherein the method further includes between steps C) and D):
connecting the vacuum pumping system in direct gas communication with the target volume;
isolating the turbo compressor system from direct gas communication with the target volume, while configuring the turbo compressor system to provide backing to the vacuum pumping system; and
operating the apparatus until the pressure within the target volume is reduced from the first intermediate pressure to the second intermediate pressure.

20. The method of claim 12, wherein the second intermediate pressure is equal to the first intermediate pressure.

21. The method of claim 12, wherein in the second configuration the vacuum pumping system is in direct gas communication with the target volume.

22. The method of claim 12, wherein in the second configuration the turbo compressor system is in direct gas communication with the target volume.

* * * * *